Dec. 15, 1936.  H. E. MARTIN  2,063,940
PROCESS FOR CONCENTRATING AQUEOUS ALIPHATIC ACIDS RECOVERED
FROM CELLULOSE ESTERIFICATION PROCESSES
Filed Oct. 5, 1934
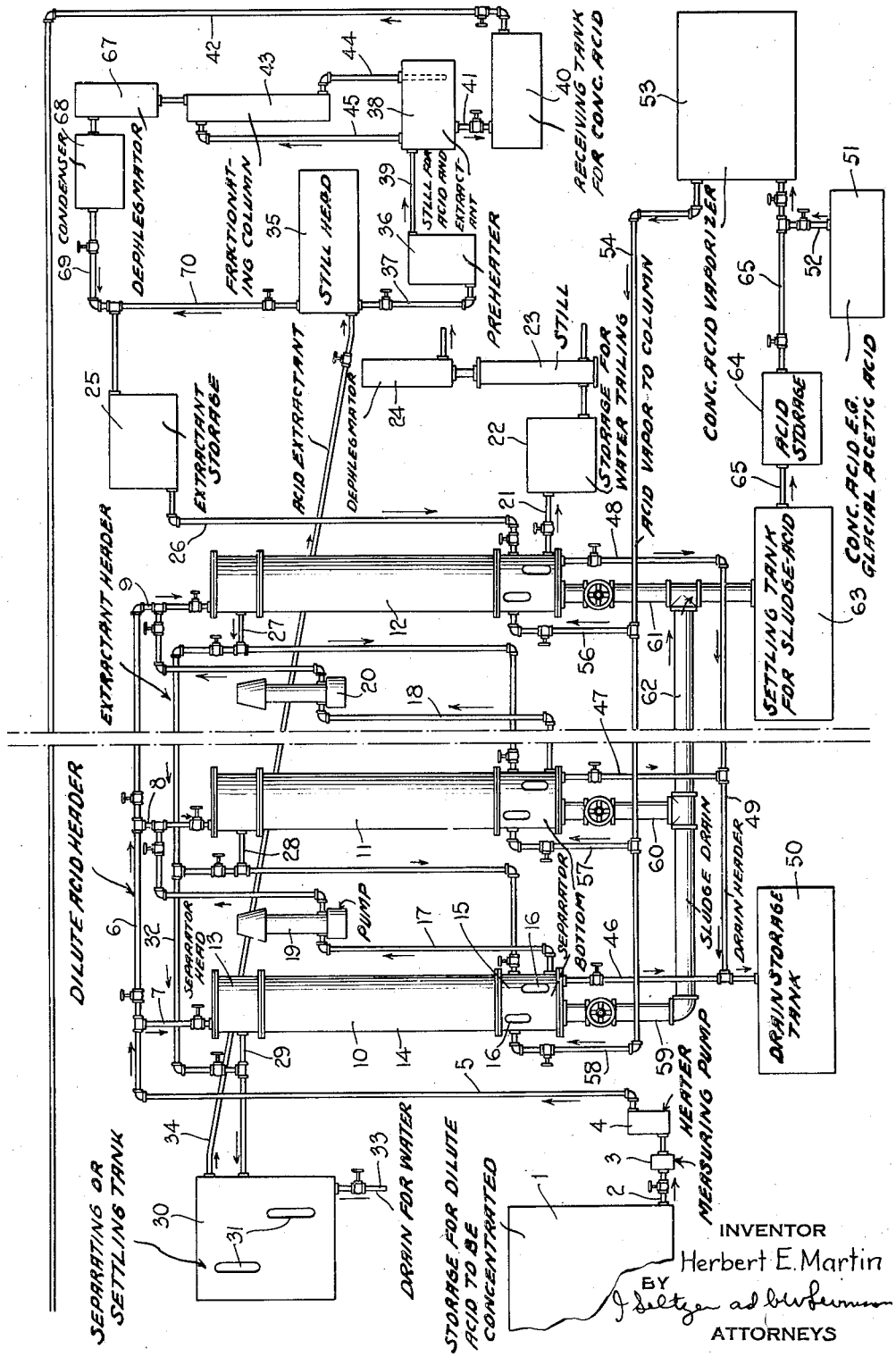
INVENTOR
Herbert E. Martin
BY
ATTORNEYS Patented Dec. 15, 1936

2,063,940

UNITED STATES PATENT OFFICE 2,063,940

PROCESS FOR CONCENTRATING AQUEOUS ALIPHATIC ACIDS RECOVERED FROM CELLULOSE ESTERIFICATION PROCESSES

Herbert E. Martin, Cumberland, Md., assignor to Celanese Corporation of America, a corporation of Delaware Application October 5, 1934, Serial No. 747,083

6 Claims. (Cl. 260—122)

This invention relates to improvements in the method of concentrating aliphatic compounds from their aqueous or other solutions and more particularly the formation of glacial acetic acid from aqueous solutions of acetic acid as it comes from a cellulose acetylating plant.

An object of the invention is the economic and expeditious extraction of acids from their solutions and a device for carrying out the extraction that is inexpensive to construct and operate. Another object of the invention is the construction of a device that is readily cleaned of sludge and/or precipitated material. Another object of the invention is a method of removing sludge and precipitated material from an acid concentrating system. Other objects of the invention will appear from the following detailed description and drawing:

In the drawing there are shown diagrammatically and partly as a flow sheet a method and device for carrying out this invention.

In concentrating aliphatic acids by the extraction methods, two major difficulties arise—first, that of continuously and intimately mixing the extractant with the solution originally containing the acid and—second, the removal from the system of sludge, gums, precipitates, etc. that are formed by precipitation due to change in the mixture, of material soluble in a solution of acid and water that is not soluble in water alone or in mixtures of acid and the extractant for the acid. By this invention, both of these difficulties are overcome and other advantages are obtained which make for substantially complete extraction of the acid and long operating periods.

Another advantage of this invention is that for the same size device with the same rate of flow there is left in the aqueous tailings from the system less acid than by the mere turbulent flow, spray or similar methods. By this invention, the aqueous acid liquid is formed into a large area in contact with metallic, glass or similar surfaces such that the acid is substantially or completely removed from the aqueous medium while the acid extractant increases its concentration of dissolved acid, thereby greatly reducing the amount of extractant necessary to concentrate a given volume of acid with respect to the amount used in prior methods.

Apparatus constructed in accordance with this invention has the further advantage of being inexpensive in construction and easily cleaned of sludge and/or precipitate that may be formed in such processes. The construction is such that a quick and efficient method of cleaning may be employed without the removal of parts and with but a very short, if any, interruption in the extracting process.

In accordance with my invention, then, I concentrate aliphatic acids from their aqueous solutions by a counter flow acid extractant method wherein the acid to be extracted flows in a turbulent stream, countercurrent to the extractant allowing for in intimate mixture of the two liquids. Also according to my invention I provide a device that causes intimate mixing of two counter flowing liquids in contact with a large surface area that tends to thoroughly mix the liquids and an attachment to such a device whereby sludge and other precipitates, soluble in the acid or aqueous solution of the acid but not substantially soluble in the acid-extractant mixture, are removed by condensing acid vapors in said device.

This invention is applicable to the separation of water and impurities from natural aqueous aliphatic acid solutions such as those derived by distillation or fermentation of fruits, plants, etc. In this instance a concentrated aliphatic acid is recovered.

This invention is particularly applicable, however, to the concentration and recovery of aliphatic acids from aqueous solutions of same coming from treating processes in the manufacture of artificial materials and especially artificial materials containing organic esters of cellulose, etc. In the preparation of cellulose esters, the aliphatic acids or their solutions may be used in pretreating the cellulose or in the reagent employed in esterifying the same and may be also formed from the acid anhydrides employed for the esterification of the cellulose. Ordinarily, the cellulose esters are separated from the solution formed during the esterification by the addition of water. The resulting aqueous solutions of the aliphatic acids are removed by distillation, decanting, washing, etc. from the cellulose material, and these solutions may contain from 5 to more than 50% of the acid. In a plant with a large capacity this acid amounts to considerable quantities and its recovery in a pure, concentrated form is desirable.

Although this invention is applicable to the separation of aliphatic acid anhydride and/or concentrated acids from any aqueous solution of same, and by aliphatic acids is meant formic, acetic, butyric, propionic and the other acid members of the series, it will be described with particular reference to the recovery of concentrated acetic acid from aqueous solutions of said acid derived from the pretreatment of cellulose and the acetylation of cellulose in the manufacture of cellulose acetate and products containing same.

The separation of the water from the acid may be accomplished with the aid of a solvent or extractant for the acid. The solvent or extractant may be, for example, a mixture of ethyl acetate and petroleum ether or other suitable solvent or extractant that dissolves out the acid and forms a solution or mixture that separates from the water and/or the water solution. This separation may be performed by flowing the extractant through a column in a turbulent manner countercurrent to the flow of aqueous solution. As the aqueous solution of the acid in the presence of an extractant for the acid tends to form a film on any metallic, glass or other solid surface that it comes in contact with, it is the object of this invention to construct a layout of interfaces or contact surfaces such that the aqueous liquid will pass through the system, for the most part, as a film on these surfaces or as a finely divided, say atomized, film upon leaving said surfaces while the extractant washes these films or atomized particles of films by a countercurrent flow from the interstices.

This intimate mixing may be acquired by inserting into the column, baffles that both restrict the passageway causing a greater length of travel of the two liquids in contact with each other and lending a great surface area. For example the column may be filled or partially filled with Raschig rings or the like. Such a construction allows for a thorough and an intimate mixing of the two phases of liquids as well as a longer period of contact of the two liquids.

In such a construction, there may be precipitated or otherwise deposited on the surfaces a sludge or gummy substance consisting of degraded cellulosic material that is soluble in the aqueous acid solution but is not soluble in the water tailings or the acid-extractant mixture. As the acid is removed from the aqueous solution, this material is deposited in the system. Considerable work would be required as well as a long shut-down of the system to remove and clean such a device. By subjecting the assembly to the action of condensing vapors of a concentrated acid that is a solvent or partial solvent for such material, however, these materials may be dissolved and/or washed from the system. By employing vapors of the acid, the same reaches and cleans the most minute interstices resulting in a perfectly cleaned system. This may be acomplished by passing the vapors of an acid from a still to the column, allowing the vapors to condense and draining the condensate and its dissolved and/or included material from the system and preferably back to the still.

In the drawing and forming a part of this invention, there is shown a preferred type of device for use in concentrating acids from their aqueous solutions, which device is shown with means for cleaning same by the condensation of vapors therein that also forms a part of this invention. In the drawing there is diagrammatically shown a source 1 of dilute acid that may be the result of one or any number of processes. A line 2 leads from the source of dilute acid to a pump and measuring device 3 from which a line leads to a heater 4. Thus the aqueous acid may be carried from a source of supply by a measuring pump and if necessary through a heater. From the heater 4, a line 5 leads to a header line 6 from which feed lines 7, 8 and 9 lead into columns 10, 11 and 12. The lines are controlled by suitably placed valves such that the dilute acid from source 1 may be directed into any one of the columns, thus column 10 may be passed and the dilute acid directed to column 11.

The columns 10, 11 and 12 may be of any suitable size and are equipped with a head 13 wherein the two phases of liquids may separate, a body portion 14, preferably filled with Raschig rings, clay, glass or metallic rings, beads, short lengths of tubing or the like, and a bottom portion 15 equipped with sight glasses 16. The aqueous solution enters the head 13 through line 7 and passes down the column 10 to the bottom 15. Lines 17 and 18 lead from the bottom of the columns to the next adjacent column, preferably through the feed lines 8 and 9. In the lines 17, 18, 8 and 9 are suitable valves such that the liquid may be by-passed around any one or more columns. Suitably positioned in the lines 17 and 18 are pumps 19 and 20 for raising the liquid from the bottom of one column to the top of another. From the last column a line 21 leads to a storage tank 22 that is connected to a still and dephlegmator 23 and 24, respectively, or other suitable device if same be desired for removing any traces of extractant from the water tailings. If desired, the partially concentrated aqueous acid may be delivered back to the source or the same may be treated to form salts of any remaining acid or the small fraction of acid may be recovered in any suitable manner.

A tank 25 is provided as a storage tank and a pressure head tank for the extractant. A line 26 leads from the pressure head tank to the still bottom at a point above the exit line 21 of the water tailings for the purpose of conducting the extractant to the column. The extractant rises in the column and separates from the aqueous liquid in the column head 13. Lines 27 and 28 lead from the column heads of columns 12 and 11 to the next adjacent column for conducting the extractant through a series of the columns countercurrent to the aqueous liquid. A line 29 leads from the last column to a separating tank 30 equipped with sight glasses 31. The lines 27, 28 and 29 as well as the line 26 may be connected into an extractant header 32 for the purpose of by-passing the extractant past any one or more columns. The extractant, after counter flowing through the aqueous acid solution and having extracted substantially all the acid therefrom, is led to the tank 30 wherein any entrapped aqueous liquid separates to the bottom and is carried back to source 1 by a line 33.

From the tank 30 a gravity line 34 or a suitable line and pumping arrangement may be provided for carrying the extractant and its extracted acid to a still head 35. The still head 35 is connected to a preheater 36 by a line 37, while the preheater 36 is connected to a still or vaporizer 38 by a line 39 for carrying and preheating the extractant. The still 38 is connected to a concentrated acid receiving tank 40 by means of the line 41 from which the acid may be pumped to an anhydride plant or back to the acetylating plant as through the line 42.

Connected with the still by lines 44 and 45 is a condenser, fractionating column or its equivalent 43. Vapors of acid, extractant and some water pass into the fractionating column 43 from the still or vaporizer 38 at a height of about two-thirds from the bottom of the column. The still and condenser may be provided with means for carrying the distilled extractant to a mixing device and/or back to the extractant pressure head 25. Thus from the top of the fractionating column, extractant and water vapor may be led off through a dephlegmator 67 into a condenser 68 and thence by a line 69 to the receiving tank or pressure head tank 25. Entrapped water that settles out in 68 or 25 may be withdrawn from the system. The still head tank 35 may be provided with a line 70 for shunting the extractant or a part of the extractant back through the system before passing it to the still 36. At the bottom of the fractionating column, concentrated acid accumulates in a still base which may be kept boiling or the acid may be run back to the vaporizer through line 44. From the still base or the vaporizer, the concentrated acid may be drawn off continuously or intermittently and may be used either as it is or after another distillation.

There may be connected to the bottom of the columns lines 46, 47 and 48 suitably controlled by valves for draining the complete system or any part thereof. The lines 46, 47 and 48 lead to a header 49 that drains into a storage tank 50 from which lines may be provided for carrying the drained liquid to the starting point or any other part of the system or to auxiliary systems.

A suitable storage tank 51 may be provided for holding a charge of a suitable concentrated acid, say glacial acetic acid. A line 52 may lead from the storage tank to a still and vaporizer 53. A line 54, acting as a header with branch lines 56, 57 and 58, leads from the header to the bottom of the columns for leading the vapors from the vaporizer 53 to the columns. These lines are suitably controlled by valves such that the vapors may be excluded from or passed into any or all the columns as desired. From the bottom of the columns there may be drains 59, 60 and 61 connected into a header 62 that in turn is connected to a settling tank 63. The settling tank may be connected to a storage tank 64 by a line 65 and the storage tank connected to the still or vaporizer 53 by a line 66.

In operation, the cleaning method when applied to the device disclosed comprises stopping the flow of liquids to one, a set or all of the columns and draining the same. After draining the vapors of glacial acetic acid or other solvent for the particular sludge deposited in the columns are led through the line 54 to the column or columns as the case may be. The vapors enter a column and condense thereby washing the sludge to the bottom and out through the sludge drain 62 to the settling tank 63. The vapors as such enter the smallest crevices and thoroughly cleanse the system. The sludge, which resembles a tarry mass, that settles in the tank 63 may be reclaimed along with that produced in the vaporizer 53 for use in lacquers, molded articles, etc. The concentrated acid carrying dissolved matter is carried from the tank 63 to the vaporizer 53 where the acid is distilled off returning to the columns or to the tank 51. The vaporizer may be continuously or intermittently cleaned of the concentrated sludge depending upon type of vaporizer employed.

The number of columns and their size will be dependent somewhat upon the type and nature of the acid being recovered with its included materials and upon the type and particular extractant employed as well as the properties of the extractant employed with respect to those of the dilute acid. In acetic acid recovery, one column of about 20 feet in height is usually sufficient for lowering the acid content of the water tailings to below 1%, say 0.3%. In using extractants heavier in weight than the dilute acid, the columns and/or the columns and flow of liquids may be reversed in an obvious manner. The columns may be of any suitable shape in cross section, for example, circular, square, elliptical, etc. The various parts of the device may be formed of any suitable material, for example, glass, stainless steel, bronze, etc.

The elements are shown in the drawing somewhat diagrammatically and are replaceable with any type, shape, internal construction and modification, of elements adapted to perform the general functions ascribed to same. For example, a pre-purification system consisting of filters, stills etc., may be employed as the source 1 and, in place of pumps as shown, the system may be constructed to feed partially by gravity as by placing one column above the other or by any other suitable arrangement. Further, any type of still condenser, dephlegmator, etc. may be employed for separation of the concentrated acid from the extractant liquid or the wash acid from the sludge. Valves other than those shown but not numbered may be inserted in any of the lines for regulating or eliminating the flow of all or any of the liquids from all or any part of the system.

The system may be altered to adapt it to any type of extractant. Examples of extractants are mixtures of petroleum ether, kerosene, benzol, etc. with ethyl ether, ethyl acetate, chloroform, acetone, oil, etc., ethers of phenols, ethylene chloride or other extractants which constitute, either singly or in mixtures, suitable means for the subsequent distillation and removal of the water azeotropically.

It is to be understood that the foregoing detailed description and drawing are merely given by way of illustration and many alterations may be made therein without departing from the spirit of my invention.

Having described my invention, what I desire to secure by Letters Patent is:

1. Process for concentrating aqueous aliphatic acids recovered from cellulose esterification processes, which comprises passing the aqueous acid in counter-current to a substantially water-immiscible solvent for the acid through a column containing a contact material having a large and interrupted surface, removing the aqueous residue and the acid extract separately from the column, and periodically interrupting the flow of aqueous acid and solvent, draining the column, feeding into the column the vapor of a solvent for precipitated solids contained in the column, condensing the said vapor in the column, and removing the condensate from the column.

2. Process for concentrating aqueous acetic acid recovered from cellulose acetylation processes, which comprises passing the aqueous acetic acid in counter-current to a substantially water-immiscible solvent for acetic acid through a column containing a contact material having a large and interrupted surface, removing the aqueous residue and the acid extract separately from the column, and periodically interrupting the flow of aqueous acid and solvent, draining the column, feeding into the column the vapor of a solvent for precipitated solids contained in the column, condensing the said vapor in the column, and removing the condensate from the column.

3. Process for concentrating aqueous acetic acid recovered from cellulose acetylation processes, which comprises passing the aqueous acetic acid in counter-current to a substantially water-immiscible solvent for acetic acid through a column packed with Raschig rings, removing the aqueous residue and the acid extract separately from the column, and periodically interrupting the flow of aqueous acid and solvent, draining the column, feeding into the column the vapor of a solvent for precipitated solids contained in the column, condensing the said vapor in the column, and removing the condensate from the column.

4. Process for concentrating aqueous aliphatic acids recovered from cellulose esterification processes, which comprises passing the aqueous acid in counter-current to a substantially water-immiscible solvent for the acid through a column containing a contact material having a large and interrupted surface, removing the aqueous residue and the acid extract separately from the column, and periodically interrupting the flow of aqueous acid and solvent, draining the column, feeding into the column substantially anhydrous vapor of the acid, condensing the said vapor in the column, and removing the condensate from the column.

5. Process for concentrating aqueous acetic acid recovered from cellulose acetylation processes, which comprises passing the aqueous acetic acid in counter-current to a substantially water-immiscible solvent for acetic acid through a column containing a contact material having a large and interrupted surface, removing the aqueous residue and the acid extract separately from the column, and periodically interrupting the flow of aqueous acid and solvent, draining the column, feeding into the column substantially anhydrous acetic acid vapor, condensing the said vapor in the column, and removing the condensate from the column.

6. Process for concentrating aqueous acetic acid recovered from cellulose acetylation processes, which comprises passing the aqueous acetic acid in counter-current to a substantially water-immiscible solvent for acetic acid through a column containing a contact material having a large and interrupted surface, removing the aqueous residue and the acid extract separately from the column, and periodically interrupting the flow of aqueous acid and solvent, draining the column, feeding into the column substantially anhydrous acetic acid vapor, condensing the said vapor in the column, removing the condensate from the column, revaporizing the condensate, and feeding the resulting vapor into the column.

H. E. MARTIN.